United States Patent
Jang et al.

(10) Patent No.: US 8,048,932 B2
(45) Date of Patent: Nov. 1, 2011

(54) FABRICATION METHOD OF CACO3 NANOPARTICLES USING BEADS MILLING

(75) Inventors: Hee Dong Jang, Daejeon (KR); Kuk Cho, Daejeon (KR); Byoung-Gyu Kim, Daejeon (KR)

(73) Assignee: Korea Institute of Geoscience and Material Resources, Daejeon (KR)

( * ) Notice: Subject to any disclaimer, the term of this patent is extended or adjusted under 35 U.S.C. 154(b) by 344 days.

(21) Appl. No.: 12/351,469

(22) Filed: Jan. 9, 2009

(65) Prior Publication Data

US 2010/0048741 A1    Feb. 25, 2010

(30) Foreign Application Priority Data

Aug. 21, 2008    (KR) .................. 10-2008-0082033

(51) Int. Cl.
*C08J 3/02*    (2006.01)

(52) U.S. Cl. .................................. 516/98; 428/32.1

(58) Field of Classification Search .............. 516/98; 428/32.1; 977/742, 842
See application file for complete search history.

(56) References Cited

U.S. PATENT DOCUMENTS

| 4,835,195 A | 5/1989 | Rayfield et al. |
| 2008/0233314 A1* | 9/2008 | Sen et al. ............ 428/32.1 |
| 2009/0014695 A1* | 1/2009 | Lynch .................. 252/521.5 |

FOREIGN PATENT DOCUMENTS

| EP | 1752499 A1 | 2/2007 |
| JP | 2007254524 A | 10/2007 |
| KR | 0128061 B1 | 4/1998 |
| KR | 1020030095142 A | 12/2003 |
| KR | 1020040105291 A | 12/2004 |
| KR | 1020080036117 A | 4/2008 |

* cited by examiner

*Primary Examiner* — Ling Choi
*Assistant Examiner* — Chun-Cheng Wang
(74) *Attorney, Agent, or Firm* — The Webb Law Firm

(57) ABSTRACT

The present invention relates to a method for fabricating calcium carbonate nanoparticles dispersed in water from ground calcium carbonate of micrometer (μm) order using beads milling. More particularly, the present invention relates to a method for fabricating calcium carbonate nanoparticles dispersed in water by which a complex aqueous slurry comprising coarse ground calcium carbonate having an average particle size of several micrometers (μm) and a surfactant is subjected to beads milling, such that grinding and dispersion in water of the ground calcium carbonate occur simultaneously, and the resultant calcium carbonate nanoparticles have an average particle size of 10-100 nm and a unimodal clustering distribution.

6 Claims, 7 Drawing Sheets

FABRICATION METHOD OF CACO3 NANOPARTICLES USING BEADS MILLING

CROSS-REFERENCE TO RELATED APPLICATION

This application claims priority under 35 U.S.C. §119 to the benefit of Korean Patent Application No. 10-2008-0082033, filed Aug. 21, 2008, the entire contents of which are incorporated herein by reference.

BACKGROUND

1. Technical Field

The present invention relates to a method for fabricating calcium carbonate nanoparticles dispersed in water from ground calcium carbonate particles having a size of several micrometers through a milling.

2. Description of the Related Art

In general, nanoparticles refer to particles with a particle size of 100 nanometers (nm) or smaller. Because of a high surface area to volume ratio and new functionality, they are widely utilized as a new material.

Calcium carbonates are available in forms: ground calcium carbonate (GCC) or precipitated calcium carbonate (PCC). Ground or precipitated calcium carbonate particles are widely used as a filler in the manufacture of paper, plastics, rubber, paints, and the like.

Ground calcium carbonate is prepared by mechanically grinding ultrafine crystalline calcite and classifying the same. In general, it has a mesh size of 325 or smaller.

Various methods are applied to attain smaller-sized calcium carbonate particles, including multi-step dry grinding followed by classification, or a combination of wet grinding, spray drying and dry grinding followed by classification, as disclosed in Korean Patent No. 2003-95142 or 128061. However, in spite of the improvement of grinding and classification techniques, an average particle size of about 1 μm is the best result for ground calcium carbonate obtained in dry powder form.

In contrast, precipitated calcium carbonate refers to calcium carbonate prepared from chemical processing of calcite having a particle size ranging from 10 nm to 10 μm. Precipitated calcium carbonate is in general more expensive than ground calcium carbonate because it is prepared following the processing into quicklime and slaked lime, and carbonation, and it has a smaller particle size.

Not only the grinding of calcium carbonate, but also the dispersion of the ground particles is important. If the ground particles aggregate, they may not exhibit wanted characteristics as a filler.

Techniques of dispersing calcium carbonate in water are disclosed in Korean Patent Nos. 2004-105291 and 2008-36117, Japanese Patent No. 2007-254524, and so forth. However, these are no more than dispersing once-prepared calcium carbonate using a surfactant.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

The present invention has been made in an effort to solve the above-described problems associated with the prior art. Therefore, an object of the present invention is to provide a method for fabricating calcium carbonate nanoparticles dispersed in water, which requires neither a multi-step grinding/classification nor a complicated dispersion process and is capable of producing high-quality calcium carbonate nanoparticles simply and at low cost. Specifically, an object of the present invention is to provide a method for fabricating calcium carbonate nanoparticles dispersed in water, which is capable of producing high-quality calcium carbonate nanoparticles with a narrow particle size distribution and an average particle size of tens of nanometers (nm) from ground calcium carbonate having a micrometer (μm) order particle size through a simple milling process only. Thus produced calcium carbonate nanoparticles have a small particle size, a narrow particle size distribution, and a unimodal clustering distribution.

BRIEF DESCRIPTION OF THE DRAWINGS

The above and other features of the present invention will now be described in detail with reference to certain exemplary embodiments thereof illustrated in the accompanying drawings which are given hereinbelow by way of illustration only, and thus are not limitative of the present invention, and wherein.

Figure 1:
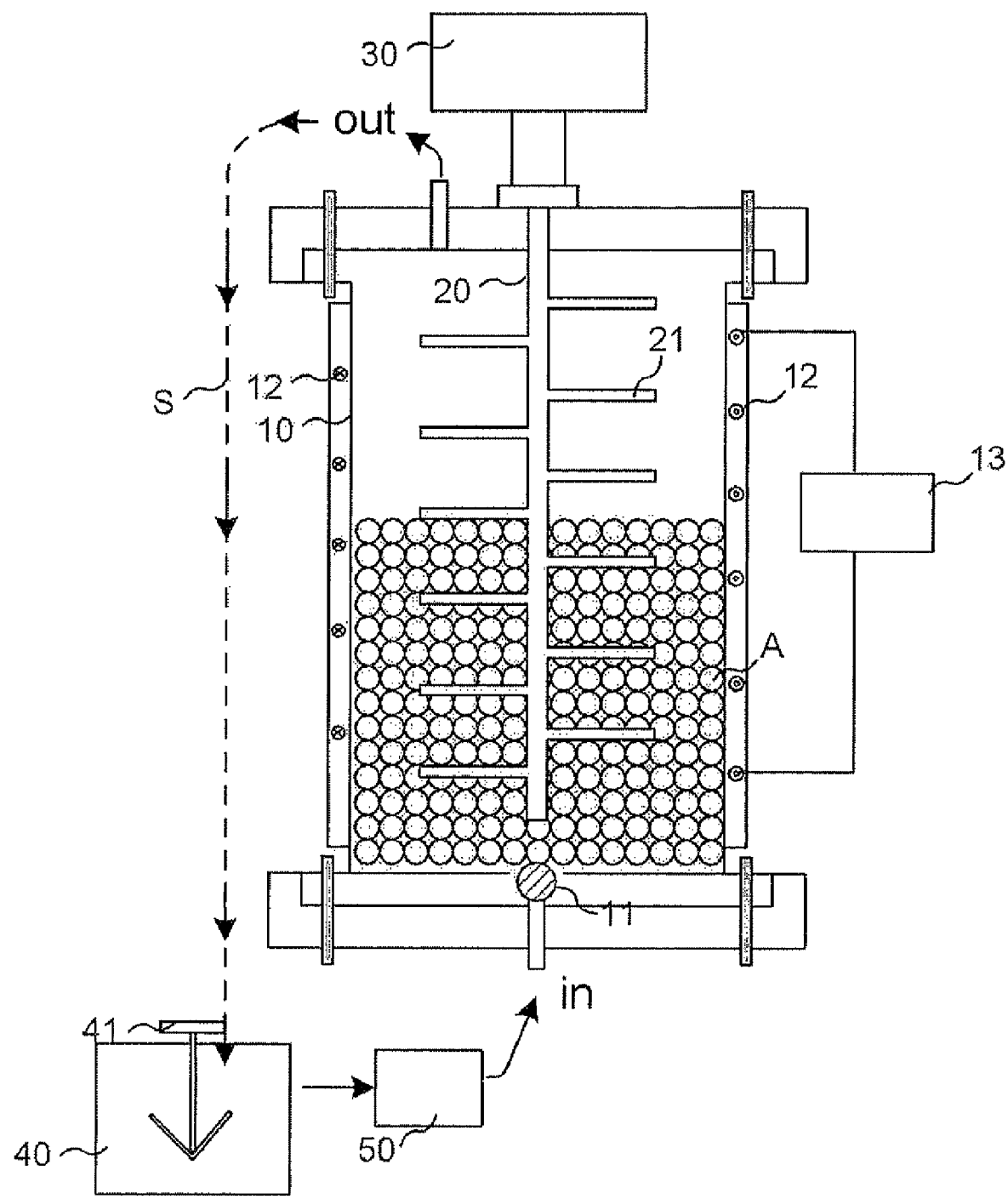
FIG. 1 schematically illustrates the cross-section of an apparatus for carrying out beads milling according to the present invention.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations and shapes will be determined in part by the particular intended application and use environment.

DETAILED DESCRIPTION OF THE INVENTION

Hereinafter, reference will now be made in detail to various embodiments of the present invention, examples of which are illustrated in the accompanying drawings and described below. While the invention will be described in conjunction with exemplary embodiments, it will be understood that the present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined in the appended claims.

The method for fabricating calcium carbonate nanoparticles according to the present invention comprises beads milling a complex aqueous slurry comprising ground calcium carbonate having an average particle size of 1-5 μm and a surfactant, wherein grinding and dispersion in water of the ground calcium carbonate are carried out simultaneously and the resultant calcium carbonate nanoparticles have an average particle size of 10-100 nm and a unimodal clustering distribution.

The average cluster size of the unimodal clustering distribution is 150-250 nm, without formation of a micrometer (μm) order clusters and with a very narrow clustering distribution.

In accordance with the method for fabricating calcium carbonate nanoparticles according to the present invention, an aqueous dispersion of calcium carbonate nanoparticles in which calcium carbonate nanoparticles having a particle size of tens of nanometers and a unimodal distribution are uniformly dispersed in water can be prepared through a simple process of beads milling from very cheap crude (micrometer order) ground calcium carbonate.

Preferably, the complex aqueous slurry comprises 5-10 weight % of ground calcium carbonate. As the grinding is carried out by the milling, the viscosity of the slurry increases. The aforesaid range of the content of the slurry is preferable in carrying out effective milling in short time, while preventing excessive viscosity increase of the slurry until the ground calcium carbonate of micrometer order is ground to an average particle size of 10-100 nm.

Preferably, the complex aqueous slurry comprises 0.5-0.7 weight % of a surfactant in order to prevent aggregation of the ground calcium carbonate particles during the milling, improve grinding efficiency by the beads for a given milling time, and prevent aggregation following the milling. When the surfactant is included in an amount less than 0.5 weight %, the aforesaid effects are slight. And, when the surfactant is included in an amount exceeding 0.7 weight %, the effect of improvement of grinding of calcium carbonate by the milling and the effect of dispersion in water are slight.

Preferably, the beads milling is carried out at 20-25° C.

FIG. 1 schematically illustrates the cross-section of an apparatus for carrying out beads milling according to the present invention. As illustrated in FIG. 1, the milling in accordance with the present invention is performed using beads A. Preferably, inside a container 10 where the milling is carried out, a rotation shaft 20 which is connected to a motor 30 and has stirring blades 21 formed radially along the length direction of the rotation shaft 20 is equipped so as to stir the beads A and induce irregular motion of thereof.

It is preferred that the stirring blade 21 is made of a refractory having a large hardness, preferably zirconia. Also, preferably, the beads A are zirconia beads surface-treated with plasma.

In the beads milling in accordance with the present invention, a slurry to be milled S is fed at a constant rate through a slurry feeding inlet IN, as illustrated in FIG. 1. The slurry S fed through the feeding inlet IN is ground and dispersed as it collides with the beads A and is discharged through a slurry outlet OUT.

Preferably, a ball 11 for preventing the backflow of the slurry S is equipped at the inlet side of the beads milling container 10. The milling container 10 is cooled by a cooling pipe 12 through which cooling water cooled by a cooling apparatus 13 flows, so as to maintain the temperature of the slurry S during the beads milling in the range from 20 to 25° C.

The beads milling in accordance with the present invention is characterized in that, after the slurry S fed to the milling container 10 is subjected to beads milling for a duration of time which is determined by the feeding rate of the slurry S, the slurry S is discharged by an internal pressure, and is fed to the milling container 10 again (continuous beads milling).

To describe in detail, an initial slurry to be milled, i.e., a complex aqueous slurry, S, is fed to a stirring tank 40. Then, it is fed at a constant feeding rate to the milling container 10 by a feeding pump 50, milled in the milling container 10 and discharged through the outlet out. The milled slurry S discharged through the outlet is returned to the stirring tank 40, and fed again to the milling container 10. The continuous beads milling is carried out by repeating these processes.

Preferably, the stirring tank 40 is equipped with a stirrer 41 for stirring the slurry S.

Preferably, the beads milling is carried out using from 50 volume % to 70 volume % of the beads, or the zirconia balls, A, based on the volume of the milling container 10 in which the beads milling is carried out, and the feeding rate of the slurry to be milled S is from 40 volume %/min to 60 volume %/min, based on the volume of the milling container.

During the milling, the volume of the zirconia balls A based on the volume of the milling container 10 (the volume of the zirconia balls A held in the milling container 10) and the speed at which the slurry S is fed (feeding rate) determine the time during which the slurry to be milled S resides in the milling container 10 and is milled and the extent of grinding. The aforesaid ranges of the volume of the zirconia balls A and the feeding rate (volume/min) are the ones enabling effective grinding in short time and providing a narrow particle size distribution of the slurry S. That is, uniform grinding and dispersion of the slurry S are ensured, and it is hardly likely that both very fine and very coarse particles exist inside the container.

If the zirconia balls have a large size, calcium carbonate can be ground very finely due to the collision between the beads and the calcium carbonate particles. But, there are the risks that the particle size distribution may broaden because of nonuniform grinding, large-sized clusters may be generated, and milling time may be increased. And, if the zirconia balls have a small size, the possibility of collision between the zirconia balls and the calcium carbonate particles for a given duration of time increases. But, the effect of grinding is slight, and there are risks that a bimodal distribution may be attained even after a long milling time.

Like the size of the zirconia balls, the speed at which the rotation shaft 20 equipped with the stirring blades 21 rotates affects the grinding efficiency, grinding time, grinding uniformity, and the formation of large-sized clusters.

Preferably, in order to grind ground calcium carbonate having an average particle size of 1-5 μm to one having an average particle size of 10-100 nm by carrying out beads milling according to the present invention and disperse the same in water with a unimodal clustering distribution, the beads milling is carried out using zirconia balls having a diameter of 100-300 μm, and the beads milling is carried out at 3000-5000 rpm.

The milling is carried out continuously under the aforesaid milling condition. If the beads milling time is too short, unground particles or huge particles (particles outside the unimodal distribution) may remain without being ground.

And, if the beads milling time is too long, it is highly likely that large-sized clusters may be formed. To prevent these problems and fabricate calcium carbonate nanoparticles dispersed in water which are uniformly ground to a particle size of tens of nanometers and have a unimodal clustering distribution, the beads milling is preferably carried out for 30-120 minutes.

Preferably, poly(acrylic acid) sodium salt was chosen as the surfactant. As sodium is dissolved in water and acrylate is attached on the surface of calcium carbonate, the calcium carbonate particle has a negative charge. The electrostatic repulsion between the particles leads to dispersion thereof.

The fabrication method according to the present invention is advantageous in that micrometer sized ground calcium carbonate can be prepared into value-added calcium carbonate nanoparticles having a narrow particle size distribution and an average particle size of tens of nanometers through a simple process involving the addition of a small amount of surfactant, and that highly-dispersed calcium carbonate nanoparticles having an average cluster size of 150-250 nm and a narrow and unimodal clustering distribution can be obtained.

Further, because multistep grinding/classification processes or complicated dispersion processes are not required and value-added calcium carbonate nanoparticles dispersed in water can be prepared through continuous milling using a very small amount of single surfactant, fabrication time and cost can be saved significantly.

EXAMPLES

Example 1

5 weight % of ground calcium carbonate (raw ore mined in Jeongseon, Korea was ground through a series of grinding processes to an average particle size of 3.2 μm) and 0.6 weight % of a poly(acrylic acid) sodium salt (Aldrich, M. W. ~8,000) were prepared into 500 mL of a slurry dispersed in water.

Beads milling was carried out using Ultra Apex Mill (UAM-015, Kotobuki, Japan). After filling a 0.2 L milling container with about 120 mL of zirconia balls having a diameter of 300 μm, milling was performed for 150 minutes at 3315 rpm, at a feeding rate of 100 mL/min.

Comparative Example 1

Milling was performed similarly to Example 1, except that a poly(acrylic acid) sodium salt was not used.

Figure 2:
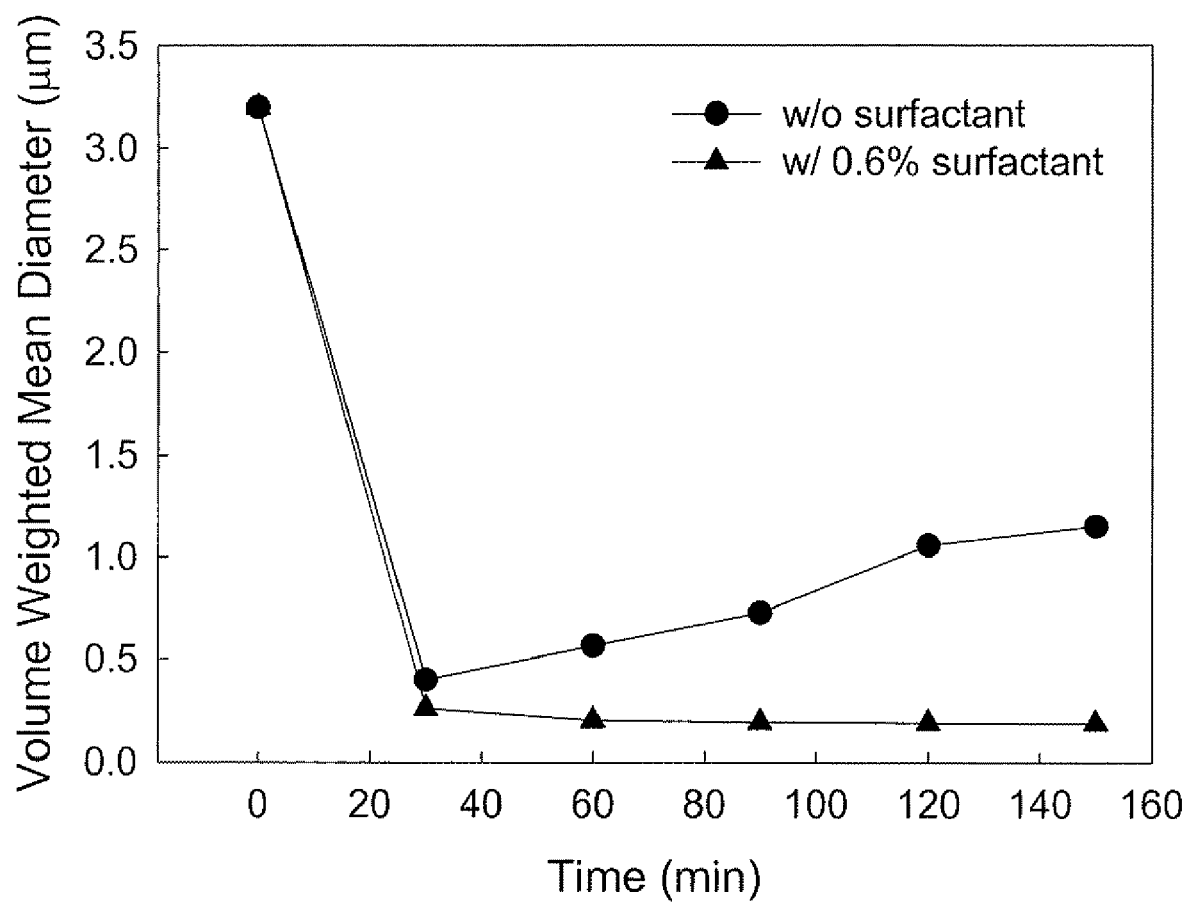
FIG. 2 shows the volume weighted mean diameter of the aqueous dispersions of calcium carbonate prepared in Example 1 and Comparative Example 1 depending on milling time.

FIG. 2 shows the volume weighted mean diameter of the aqueous dispersions of calcium carbonate prepared in Example 1 and Comparative Example 1 depending on milling time.

As shown in FIG. 2, when the surfactant was not added, the volume weighted mean diameter reached the minimum of 400 nm at 30 minutes but increased gradually thereafter as aggregation proceeded. In contrast, when the surfactant was added, the volume weighted mean diameter decreased after 30 minutes and converged to about 190 nm. This indicates that the addition of the anionic surfactant, poly(acrylic acid) sodium salt, resulted in the attachment of acrylate ions on the surface of calcium carbonate and stabilized dispersion of calcium carbonate due to electrostatic repulsion.

At 150 minutes (FIG. 2), the aqueous dispersions of calcium carbonate prepared in Example 1 and Comparative Example 1 were dried and specific surface area was measured.

The measurement of the specific surface area was carried out using Quadasorb SI (Quantachrome). Particle size was calculated based on the specific surface area measurement result [6/(density of calcium carbonate×specific surface area)].

For Comparative Example 1, specific surface area was 21.4 m$^2$/g, and particle size was 112 nm. For Example 1, specific surface area was 65.1 m$^2$/g, and particle size was 36.9 nm. The calculation of particle size based on the specific surface area is a way of measuring the original particle size (primary particle size) with little effect from the formation of clusters. It was confirmed that the calcium carbonate prepared in Example 1 according to the present invention was very finely and uniformly ground.

Figure 3:
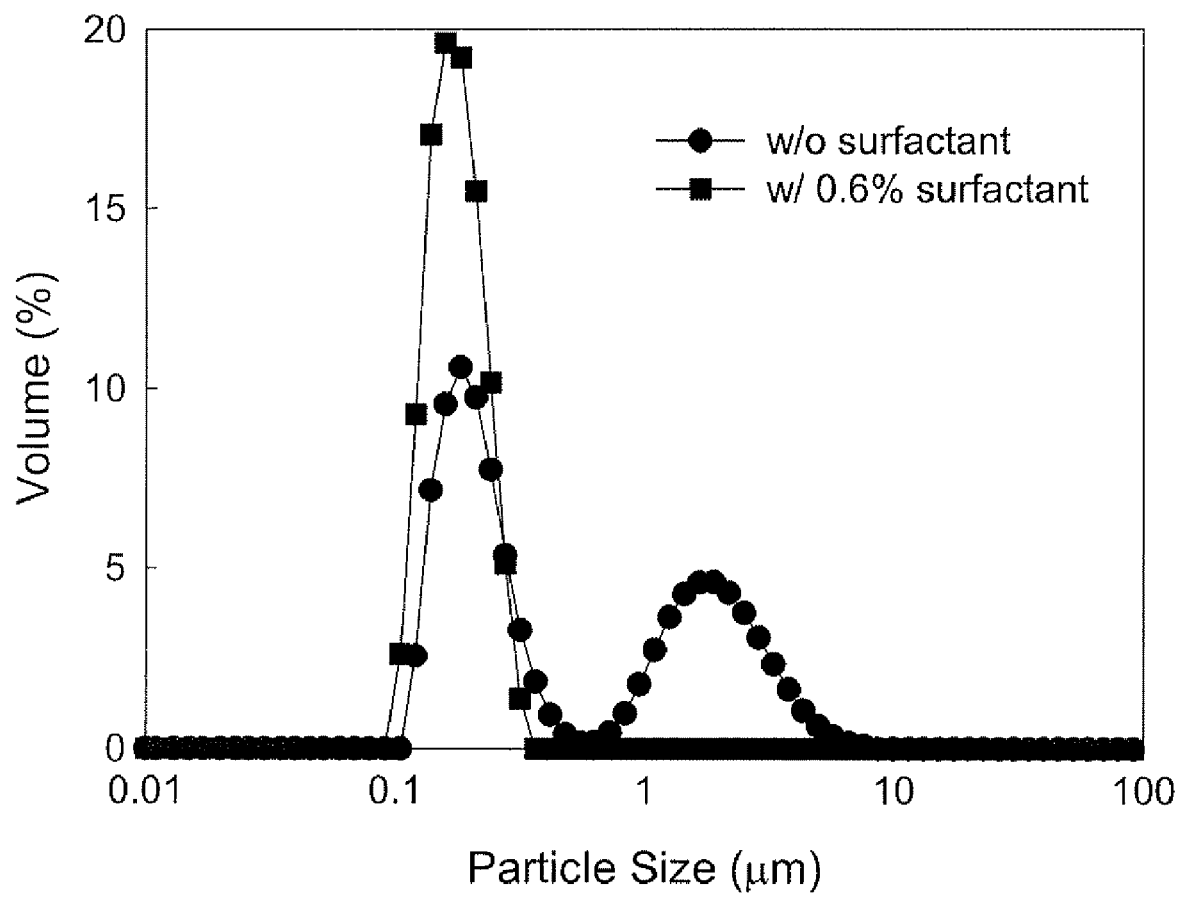
FIG. 3 shows the particle size distribution of the aqueous dispersions of calcium carbonate prepared in Example 1 and Comparative Example 1 by 120 minutes of milling.

FIG. 3 shows the particle size distribution of the aqueous dispersions of calcium carbonate prepared in Example 1 and Comparative Example 1 by 120 minutes of milling. Particle size distribution was measured using Mastersizer 2000 (Malvern, UK) which uses diffraction of light.

For Comparative Example 1, a bimodal distribution with two peaks at about 200 nm and 2 μm was identified. The second peak at 2 μm is due to the aggregation of the ground calcium carbonate.

In contrast, for Example 1, a unimodal distribution with only one peak at 200 nm was identified. As shown from FIG. 2 and the specific surface area measurement, it was confirmed that a highly-dispersed aqueous dispersion of calcium carbonate nanoparticles with better uniformity and less aggregation was obtained for the same duration of time.

Figure 4:
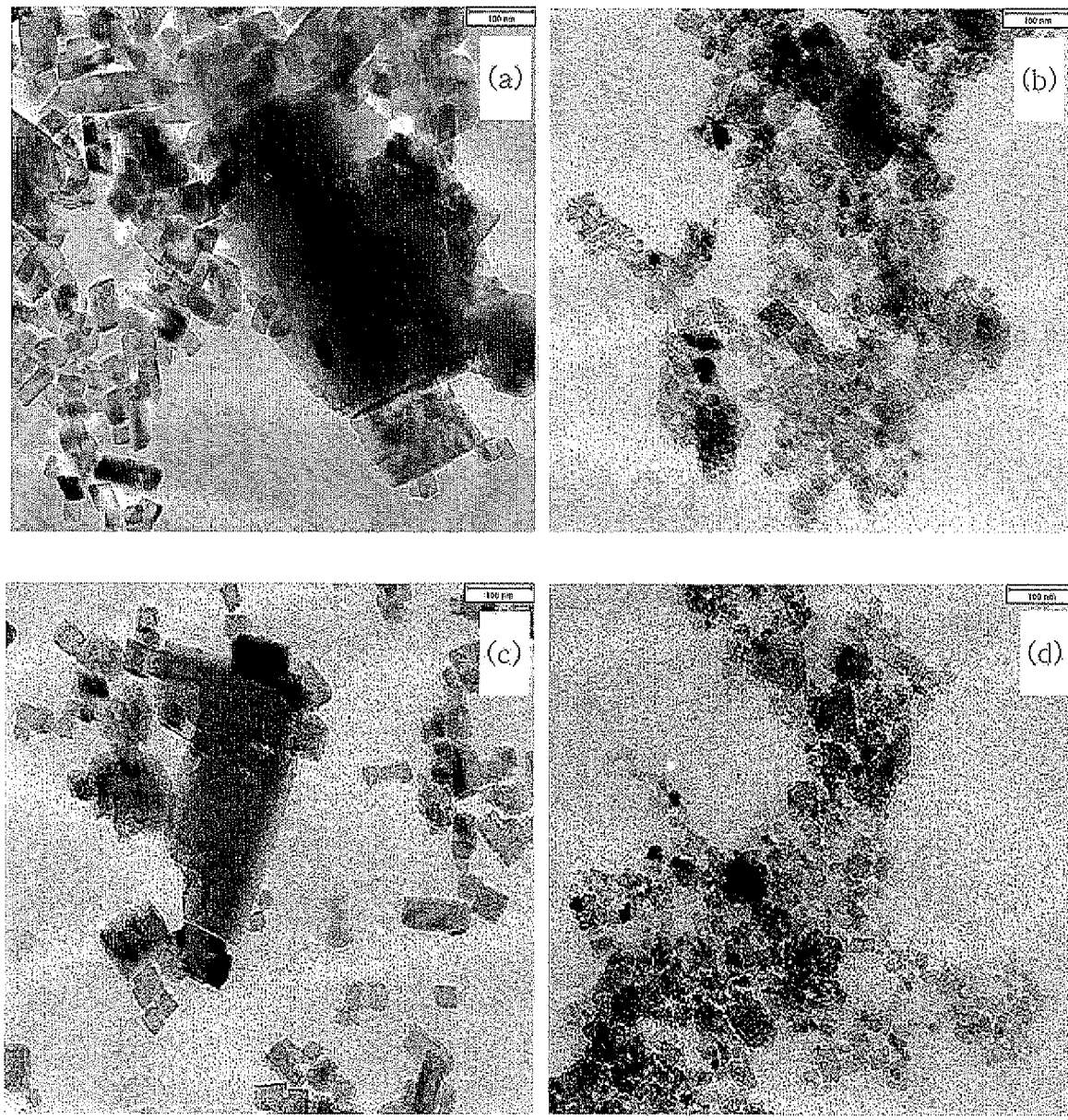
FIG. 4 shows the transmission electron microscopic (TEM) images of the aqueous dispersions of calcium carbonate prepared in Example 1 and Comparative Example 1 by 60 minutes and 120 minutes of milling, respectively, followed by drying.

FIG. 4 shows the transmission electron microscopic (TEM) images of the aqueous dispersions of calcium carbonate prepared in Example 1 and Comparative Example 1 by 60 minutes and 120 minutes of milling, respectively, followed by drying.

FIG. 4(*a*) is for Comparative Example 1 after 60 minutes of milling, FIG. 4(*b*) for Example 1 after 60 minutes of milling, FIG. 4(*c*) for Comparative Example 1 after 120 minutes of milling, and FIG. 4(*d*) for Example 1 after 120 minutes of milling.

For Comparative Example 1, the prepared calcium carbonate had a cubic shape regardless of the milling time, and it had a very broad particle size distribution of from about 50 nm to about 300 nm. For Example 1, the particle size distribution was narrow, mostly from about 10 nm to about 40 nm.

From FIG. 2 through FIG. 4 and the specific surface area measurement result, it was confirmed that the calcium carbonate prepared in accordance with the present invention had an average particle size (average primary particle size) of 10-100 nm and a narrow particle size distribution. With only some of the primary particles aggregating to form clusters (secondary particles), the aqueous dispersion of calcium carbonate nanoparticles had a unimodal distribution with an average cluster size (average secondary particle size) of 150-250 nm.

Further, measurement of zeta potential was made as a measure of dispersion stability. Zeta potential was measured at −25 mV for Example 1, and −2.85 mV for Comparative Example 1. Therefore, it was confirmed that the aqueous dispersion of calcium carbonate nanoparticles prepared by milling in Example 1 according to the present invention has very good dispersion stability.

The following preparation examples (Preparation Example 1 through Preparation Example 3) were carried out in order to establish grinding conditions for calcium carbonate at different concentrations of the slurry dispersed in water, different beads size, and different rotation speed when the surfactant was not added.

Preparation Example 1

A slurry dispersed in water was prepared similarly to Example 1 using 1 weight %, 2.5 weight %, 5 weight % and 10 weight % of ground calcium carbonate, without adding a surfactant. Beads milling was carried out using zirconia balls having a diameter of 300 μm, at 6630 rpm. Other feeding condition, total volume of the zirconia balls, total amount of the slurry, and the like were the same as in Example 1.

Figure 5:
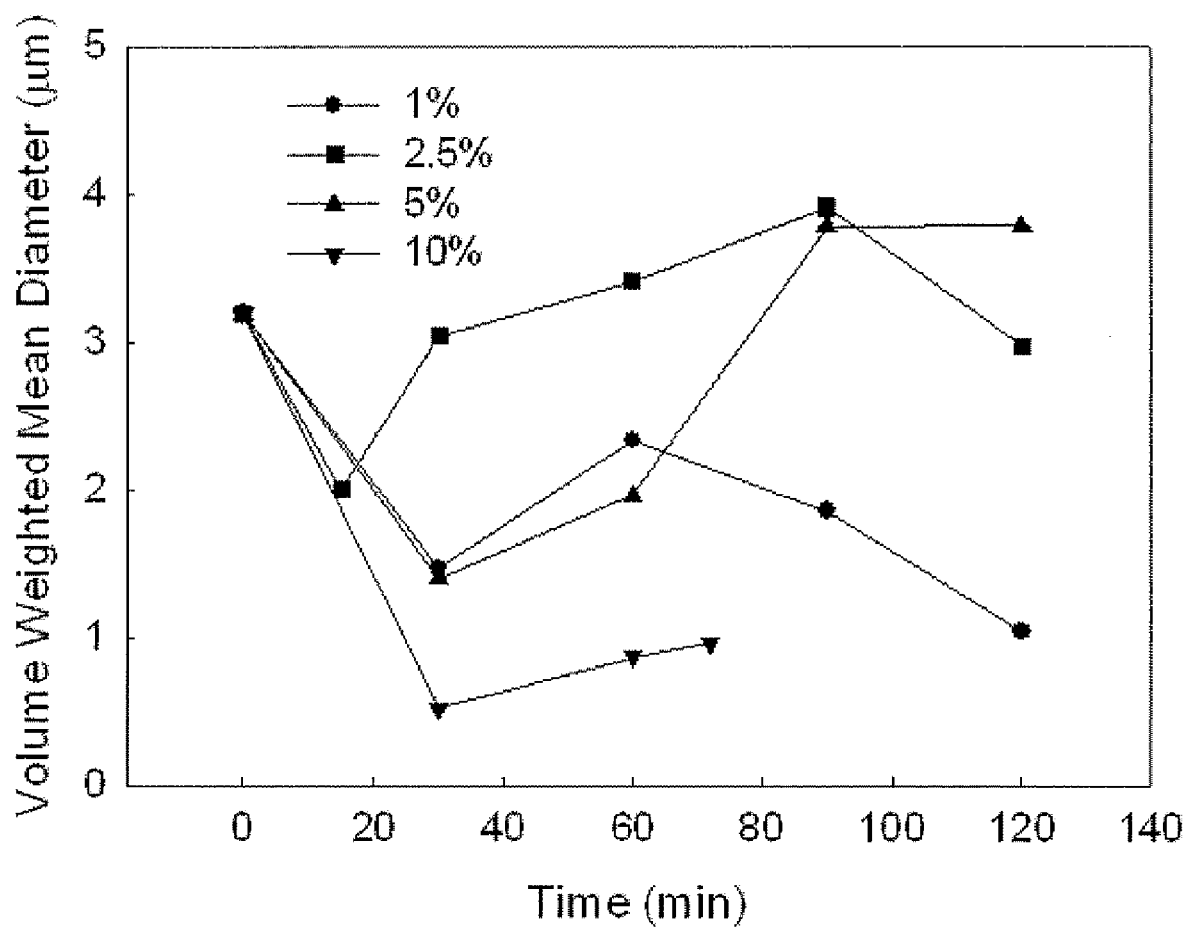
FIG. 5 shows the volume weighted mean diameter of the aqueous dispersion of calcium carbonate prepared in Example 1 depending on milling time, at different calcium carbonate concentrations.

FIG. 5 shows the volume weighted mean diameter of the aqueous dispersion of calcium carbonate prepared in Example 1 depending on milling time at different calcium carbonate concentrations.

As shown in FIG. 5, the particle size of calcium carbonate reached minimum in 15-30 minutes, and increased again thereafter. When the ground calcium carbonate concentration of the slurry was 1 weight %, 2.5 weight %, 5 weight % and 10 weight %, the minimum of the volume weighted mean diameter and the time required to reach the value were 1.048 μm (120 min), 2.005 μm (15 min), 1.401 μm (30 min) and 0.529 μm (30 min), respectively. The reason why the particle size increased again was that the ground calcium carbonate particles aggregated because the surface charge was near 0. From FIG. 5, the ground calcium carbonate concentration of the slurry needs to be controlled between 5 weight % and 10 weight % for minimized aggregation and effective grinding.

Preparation Example 2

A slurry dispersed in water was prepared similarly to Example 1 using 5 weight % of ground calcium carbonate, without adding a surfactant. Beads milling was carried out using zirconia balls having a diameter of 300 μm, at 3315 rpm, 4975 rpm and 6630 rpm. Other feeding condition, total volume of the zirconia balls, total amount of the slurry, and the like were the same as in Example 1.

Figure 6:
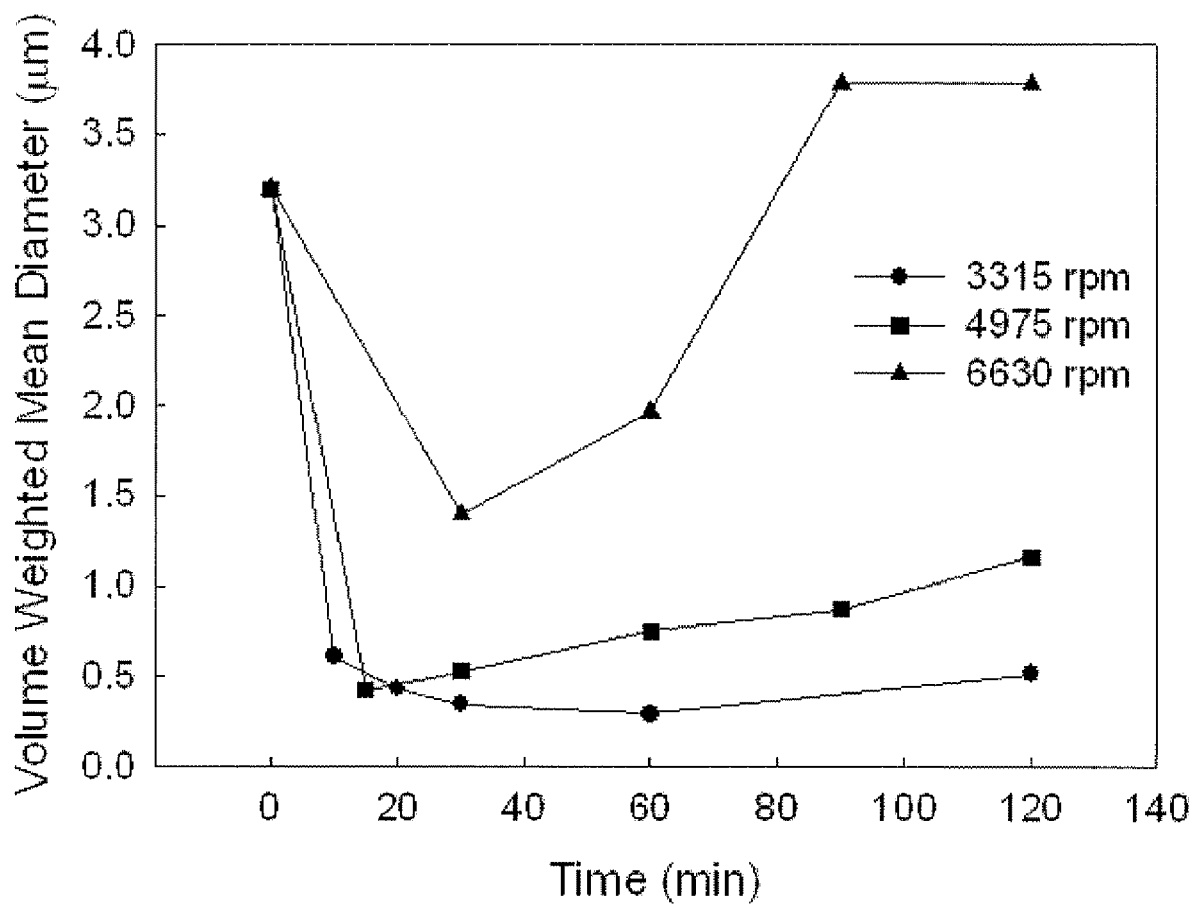
FIG. 6 shows the volume weighted mean diameter of the aqueous dispersion of calcium carbonate prepared in Example 2 depending on milling time, at different revolutions per minute (rpm)

FIG. 6 shows the volume weighted mean diameter of the aqueous dispersion of calcium carbonate prepared in Example 2 depending on milling time, at different rpm. The volume weighted mean diameter reached minimum and increased again due to aggregation, at all of the three rotation speeds. When the rotation speed was 6630 rpm, 4975 rpm, and 3315 rpm, the minimum of the volume weighted mean diameter and the time required to reach the value were 1.401 μm (30 min), 0.427 μm (15 min), and 0.294 μm (60 min), respectively. The cluster size was larger at a higher rotation speed. From FIG. 6, the rotation speed during the milling needs to be controlled between 3000 and 5000 rpm for minimized aggregation and effective grinding.

Preparation Example 3

A slurry dispersed in water was prepared similarly to Example 1 using 5 weight % of ground calcium carbonate, without adding a surfactant. Beads milling was carried out using zirconia balls having a diameter of 30 μm, 100 μm, and 300 μm at 4975 rpm. Other feeding condition, total volume of the zirconia balls, total amount of the slurry, and the like were the same as in Example 1.

Figure 7:
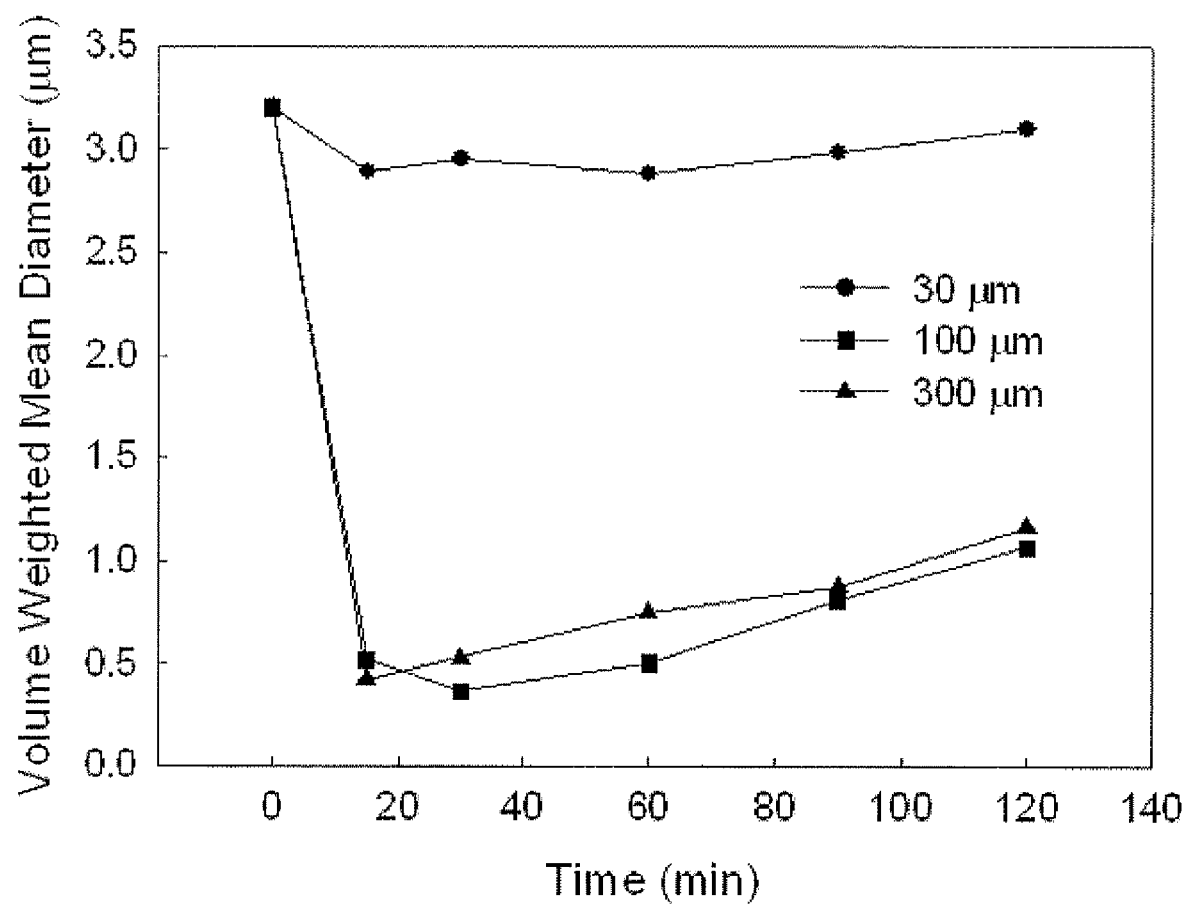
FIG. 7 shows the volume weighted mean diameter of the aqueous dispersion of calcium carbonate prepared in Example 3 depending on milling time, at different beads sizes.

FIG. 7 shows the volume weighted mean diameter of the aqueous dispersion of calcium carbonate prepared in Example 3 depending on milling time, at different beads sizes.

When the beads size was 30 μm, 100 μm, and 300 μm, the minimum of the volume weighted mean diameter and the time required to reach the value were 2.879 μm (60 min), 0.368 μm (30 min), and 0.427 μm (15 min), respectively. When the beads size was 30 μm, grinding hardly occurred. the beads size needs to be controlled between 100 and 300 μm for uniform grinding, minimized aggregation and effective grinding in short time.

The invention has been described in detail with reference to preferred embodiments thereof However, it will be appreciated by those skilled in the art that changes may be made in these embodiments without departing from the principles and spirit of the invention, the scope of which is defined in the accompanying claims and their equivalents.

What is claimed is:

1. A method for fabricating calcium carbonate nanoparticles dispersed in water, comprising beads milling a complex aqueous slurry comprising 5-10 weight % of ground calcium carbonate having an average particle size of 1-5 μm and 0.5-0.7 weight % of a surfactant, wherein grinding and dispersion in water of the ground calcium carbonate are carried out simultaneously and the resultant calcium carbonate nanoparticles have an average particle size of 10-100 nm and a unimodal clustering distribution with an average cluster size of 150-250 nm.

2. The method for fabricating calcium carbonate nanoparticles dispersed in water as set forth in claim 1, wherein the beads milling is carried out continuously using from 50 volume % to 70 volume % of zirconia balls, based on the volume of a milling container in which the beads milling is carried out, and the feeding rate of the slurry to be milled is from 40 volume %/min to 60 volume %/min, based on the volume of the milling container.

3. The method for fabricating calcium carbonate nanoparticles dispersed in water as set forth in claim 2, wherein the beads milling is carried out 3000-50000 rpm using zirconia balls having a diameter of 100-300 μm.

4. The method for fabricating calcium carbonate nanoparticles dispersed in water as set forth in claim 3, wherein the beads milling is carried out for 30-120 minutes.

5. The method for fabricating calcium carbonate nanoparticles dispersed in water as set forth in claim 1, wherein the surfactant is a poly(acrylic acid) sodium salt.

6. The method for fabricating calcium carbonate nanoparticles dispersed in water as set forth in claim 3, wherein the beads milling is carried out at 20-25° C.

* * * * *